Richardson & Taylor,

Churn.

No. 108631. Patented Oct. 25, 1870.

Witnesses
Jno. A. Ellis.
J. V. White.

Inventors
S. C. Richardson & L. Taylor,
Per
T. Y. _____
Atty.

United States Patent Office.

JAMES C. RICHARDSON, OF PRAIRIE DU CHIEN, AND LEMUEL TAYLOR, OF JORDAN, WISCONSIN.

Letters Patent No. 108,631, dated October 25, 1870; antedated September 30, 1870.

IMPROVEMENT IN CHURNS.

The Schedule referred to in these Letters Patent and making part of the same.

*To all whom it may concern:*

Be it known that we, JAMES C. RICHARDSON, of Prairie du Chien, county of Crawford, and LEMUEL TAYLOR, of Jordan, in the county of Green and State of Wisconsin, have invented certain new and useful Improvements in Churns; and we do hereby declare that the following is a full, clear, and exact description thereof, reference being had to the accompanying drawings and to the letters of reference marked thereon, which form a part of this specification.

The nature of our invention consist in the construction and arrangement of a "churn" having an up-and-down of the dasher or plunger, as will be hereinafter set forth.

In order to enable others skilled in the art to which our invention appertains to make and use the same, we will now proceed to describe its construction and operation, referring to the annexed drawings, in which—

Figure 1:
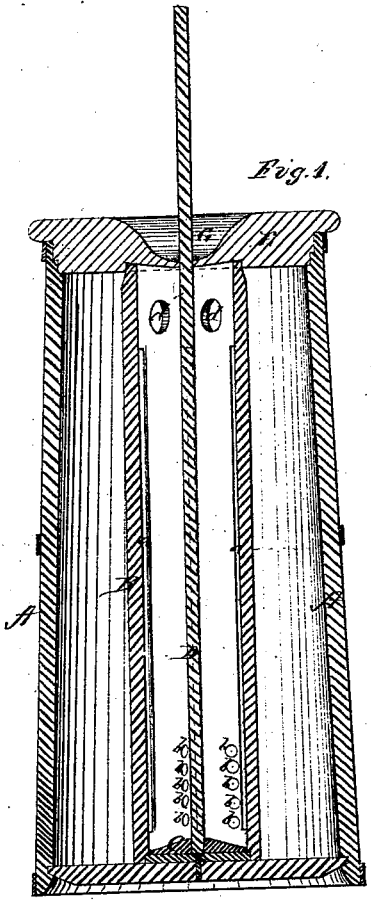
Figure 2:
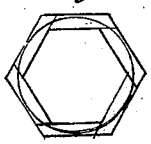

Figure 1 is a vertical section of our churn, and
Figure 2 is a plan view of a cylinder placed in the center of the same.

A represents the churn, of the usual style known as "tub-churns," being narrower at the top than at the bottom.

In the center of the bottom of the churn is placed an upright cylinder, B. We call this a cylinder, although it is not round, but hexagon or polygonal shaped, as seen in fig. 2.

Every side of the cylinder B is provided with a slot, *a*, which runs longitudinally from near the lower end to a suitable distance from the top. The slots *a a* are not cut at right angles through the sides of the cylinder, but are inclined; that is, on the inside of the cylinder the openings are at the corners, while on the outside they run nearer the center of the side.

Each side is further at the lower end provided with a series of holes, or perforations, *b b*, which are also inclined in a direction opposite to that of the slots *a a*. Near the upper end each side has also a larger hole, *d*.

Within the cylinder B is placed a polygonal-shaped plunger or dasher, C, provided with a staff or rod, D, which passes up through the lid E of the churn.

The lid E has a countersink or recess, G, around the center, where the staff D passes, so that any cream that may splash up will be carried back into the churn.

The cylinder B extends up close to the under side of the lid E.

The dasher being worked in the usual manner, up and down, forces the cream through the slots and perforations in the cylinder, breaking the cream thoroughly, and making the butter collect much sooner and better.

We are aware that the patent of Wm. Hamilton describes an internal cylinder, but it will be observed that his cylinder is permanently secured to the bottom of the exterior case or churn; nor are the openings in the internal cylinder so arranged as to cause cross currents of the milk in the upward and downward stroke of the dash, as is the case with ours.

Having thus fully described our invention,
What we claim as new, and desire to secure by Letters Patent, is—

1. The removable cylinder B in combination with churn A, as and for the purpose set forth.
2. The combination of churn A, cylinder B, and dasher C, all constructed and arranged to operate in the manner and for the purpose described.

In testimony that we claim the foregoing as our own, we affix our signatures in presence of two witnesses.

J. C. RICHARDSON.
L. TAYLOR.

Witnesses:
ADDIE CADY,
ELNORA C. RICHARDSON.